(12) United States Patent
Carmona

(10) Patent No.: US 7,234,164 B2
(45) Date of Patent: Jun. 19, 2007

(54) METHOD AND SYSTEM FOR BLOCKING EXECUTION OF MALICIOUS CODE

(75) Inventor: Itshak Carmona, Petach-Tikva (IL)

(73) Assignee: Computer Associates Think, Inc., Islandia, NY (US)

( * ) Notice: Subject to any disclaimer, the term of this patent is extended or adjusted under 35 U.S.C. 154(b) by 510 days.

(21) Appl. No.: 10/307,851

(22) Filed: Dec. 2, 2002

(65) Prior Publication Data
US 2004/0083383 A1    Apr. 29, 2004

Related U.S. Application Data

(60) Provisional application No. 60/334,420, filed on Nov. 30, 2001.

(51) Int. Cl.
*G08B 23/00* (2006.01)

(52) U.S. Cl. ............................ 726/22; 713/188; 726/24

(58) Field of Classification Search .................. 726/24, 726/22; 713/188
See application file for complete search history.

(56) References Cited

U.S. PATENT DOCUMENTS 6,272,641 B1 *   8/2001   Ji ................................. 726/24

* cited by examiner

*Primary Examiner*—Kambiz Zand
*Assistant Examiner*—Jacob Lipman
(74) *Attorney, Agent, or Firm*—Baker Botts L.L.P.

(57) ABSTRACT

A method of preventing execution of malicious code included in program code executable by a computer system may include reading program code from a storage medium, identifying at least a section of malicious code in the program code, providing blocking code which prevents execution of the section of malicious code and attaching the blocking code to the malicious code so that the malicious code is prevented from being executed. The blocking code may instruct the computer system to skip over, rename or delete the section of malicious code, for example.

31 Claims, 2 Drawing Sheets

METHOD AND SYSTEM FOR BLOCKING EXECUTION OF MALICIOUS CODE

REFERENCE TO RELATED APPLICATIONS

The present specification is based on and claims the benefit of Provisional Application 60/334,420 filed Nov. 30, 2001, the entire contents of which are herein incorporated by reference.

FIELD OF THE DISCLOSURE

The present disclosure relates to computer virus cures and, more particularly, to a method and system for blocking execution of malicious code.

RELATED ART

A computer virus is a type of malicious code capable of modifying a computer's resources. More specifically, a computer virus can be a program (or some unit of code, e.g., instructions to which the computer responds, such as a code block, code element or code segment) that may attach to other programs and/or objects, may replicate itself, and/or may perform unsolicited or malicious actions on a computer system. The present disclosure may be applied to any type of malicious code capable of modifying one or more portions of a computer's resources.

The recent increase in the spread of computer viruses underscores the necessity for not only detecting malicious code, but also preventing the malicious code from doing harm after it is detected. In other words, a computer system should be capable of detecting malicious code and preventing it from being executed. A computer virus often inserts malicious code in otherwise useful applications or objects. Thus, while the malicious code should not be executed, it would be desirable if the program code of the application or program in which the malicious code is embedded were still capable of being executed in order to provide the function or service for which the application or program was intended.

Currently available computer software is capable of detecting malicious code included in a computer executable program or application. Some of these currently available computer software programs are capable of preventing execution of malicious code by renaming or deleting the malicious code.

Therefore, it would be desirable to provide a method and system for blocking execution of malicious programs.

SUMMARY OF THE DISCLOSURE

A method of preventing execution of malicious code included in program code executable by a computer system includes reading the program code from a storage medium of the computer system, detecting a section of malicious code included in the program code read out from the storage medium, providing blocking code which prevents the computer system from executing the section of malicious code and attaching the blocking code to the section of malicious code such that execution of the malicious code is prevented. The blocking code may be encrypted such that the blocking code cannot be identified and removed from the section of malicious code.

The method may include a step of identifying a format of the malicious code, wherein the blocking code is provided to be in a format similar to the format of the malicious code.

The blocking code may be a unit of computer executable code which provides instructions to prevent execution of instructions provided by the malicious code by a processor of the computer system which executes the program code.

The blocking code may instruct the computer system to pass over the section of malicious code while executing the program code without executing the malicious code.

The blocking code may instruct the computer system to rename a file including the section of malicious code such that the computer system does not access a resulting renamed file The blocking code may instruct the computer system to delete the section of malicious code The blocking code may instruct the computer system to copy the section of malicious code to another location in the computer system.

The blocking code may be attached to the malicious code at a position based on how the blocking code prevents execution of the malicious code.

The type of damage that the malicious code causes to the computer system may be determined and the blocking code may be provided based on the type of damage the malicious code causes to the computer system.

A system for preventing execution of malicious code included in program code executable by a computer system includes a reading device adapted to read the program code from a storage medium of the computer system, a code detecting device adapted to detect a section of malicious code included in the program code, a code providing device adapted to provide blocking code to prevent execution of the section of the malicious code by the computer system and a code attaching device adapted to attach the blocking code to the section of malicious code such that execution of the section of malicious code is prevented.

The code providing device may include an encrypting device adapted to encrypt the blocking code such that the blocking code cannot be identified and removed from the section of malicious code.

The system may include a format recognition device adapted to identify a format of the malicious code, wherein the locking code provided by the code providing device is provided in a format similar to the format of the malicious code.

The blocking code may be a unit of computer executable code which provides instructions to a processor of the computer system executing the program code to prevent execution of instructions provided by the section of malicious code.

The blocking code may instruct the computer system to pass over the section of malicious code while executing the program code without executing the section of malicious code.

The system may include a renaming device adapted to rename a file including the section of malicious code based on instructions provided by the blocking code such that the computer system does not access a resulting renamed file.

The system may include a code deleting device adapted to delete the section of malicious code in accordance with instructions provided by the blocking code.

The system may include a transfer device adapted to transfer the section of malicious code to a section of the computer system where the malicious code does not affect the computer system according to instructions provided by the blocking code.

The blocking code may be attached to the malicious code at a position based on how the blocking code prevents execution of the malicious code.

The code detecting device may determine a type of damage that the malicious code causes to the computer system and the blocking code provided by the code providing device may be provided based on the type of damage that the malicious code causes to the computer system A program storage medium, readable by a computer system, embodying a program of instructions executable by the computer system to perform method steps for preventing execution of malicious code included in program code executable by the computer system, the method steps including reading the program code from a storage medium of the computer system, detecting a section of malicious code included in the program code, providing blocking code which prevents execution of the section of malicious code, and attaching the blocking code to the section of malicious code such that execution of the section of malicious code is prevented.

The method steps may further include encrypting the blocking code so that the blocking code cannot be identified and removed from the section of malicious code.

The method steps may further include identifying a format of the malicious code, wherein the blocking code is provided to be in a format similar to the format of the malicious code.

The blocking code may be computer executable code which provides instructions to a processor of the computer system which executes the program code to prevent execution of instructions provided by the section of malicious code.

The blocking code may instruct the computer system to pass over the section of malicious code while executing the program code without executing the section of malicious code.

The blocking code may instruct the computer system to rename a file including the section of malicious code such that the computer system will not access a resulting renamed file.

The blocking code may instruct the computer system to delete the section of malicious code The blocking code may instruct the computer system to transfer the section of malicious code to a section of the computer system where the section of malicious code will not affect the computer system.

The blocking code may be attached to the malicious code at a position based on how the blocking code prevents execution of the malicious code.

The method steps may include determining a type of damage that the malicious code causes to the computer system and the blocking code may be provided based on the type of damage the malicious code causes to the computer system.

A computer system including a processor and a program storage device readable by the computer system, embodying a program of instructions executable by the processor to perform method steps for preventing execution of malicious code included in program code which is executable by the computer system. The method steps include reading the program code from a storage medium of the computer system, detecting a section of malicious code included in the program code, providing blocking code which prevents execution of the section of malicious code, and attaching the blocking code to the section of malicious code such that execution of the section of malicious code is prevented.

A method of preventing execution of malicious code included in program code executable by a computer system includes reading the program code from a storage medium of the computer system, detecting a section of malicious code in the program code, adding a name of a file in which the section of malicious code is located to a list of files containing malicious code, providing a control code associated with the list of files containing malicious code and providing the control code to a file management system of the computer system to control the file management system to prevent accessing any file included in the list of files containing malicious code.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
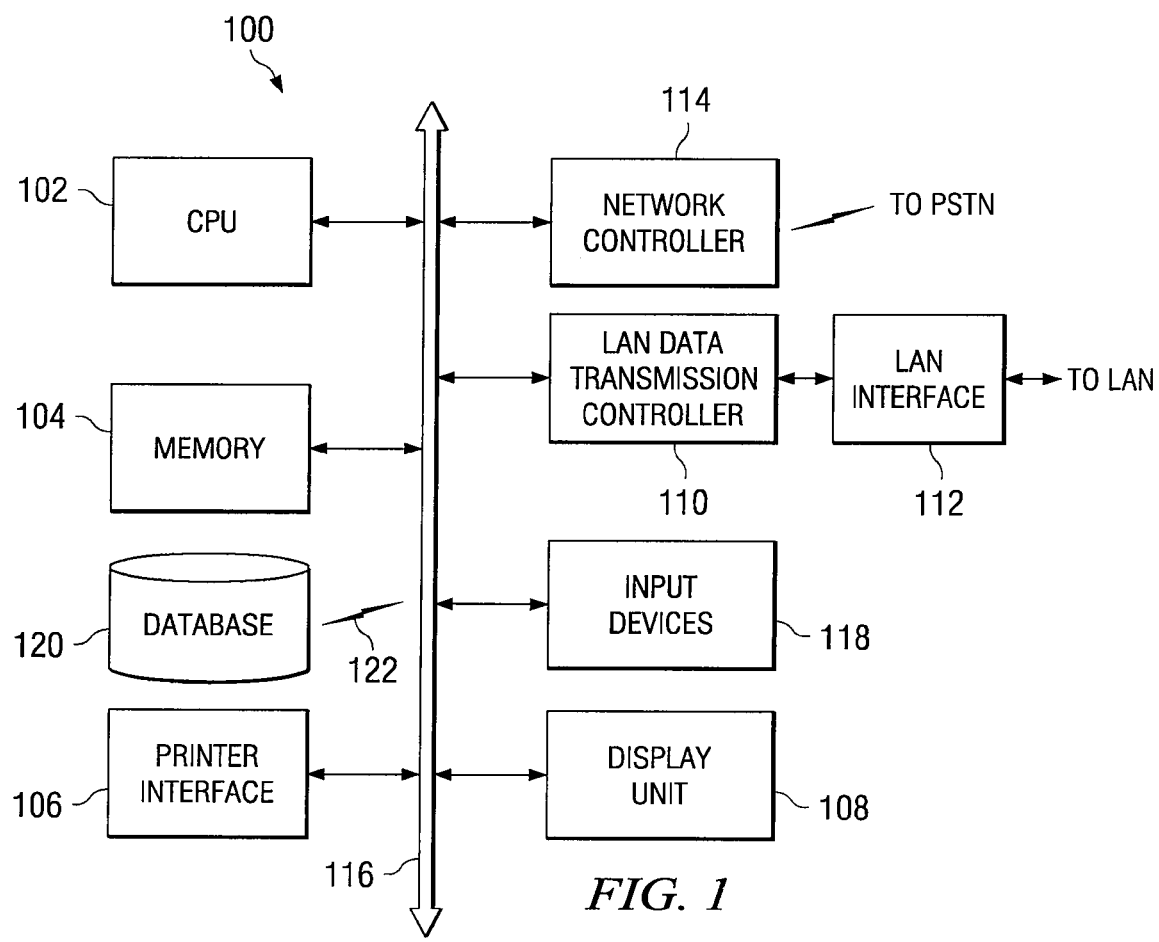
FIG. 1 is an illustration of a computer system for implementing a method and system according to the present disclosure.

In describing the preferred embodiments of the present disclosure illustrated in the drawings, specific terminology is employed for sake of clarity. However, the present disclosure is not intended to be limited to the specific terminology so selected and it is to be understood that each specific element includes all technical equivalents which operate in a similar manner.

The present method and system for preventing execution of malicious code included in program code executable by a computer system provides for reading the program code from a storage medium, detecting a section of malicious code included in the program code, providing blocking code which prevents execution of the malicious code, and attaching the blocking code to the section of malicious code. The attached blocking code then prevents the malicious code from being executed.

The system and method may be implemented in the form of a software application running on a computer system such as a mainframe, personal computer (PC), handheld computer server etc The computer system may be linked to a database or various types of storage media. The link may be, for example, via a direct link such as a direct hard wire or wireless connection, via a network connection such as a local area network, or via the Internet.

An example of a computer system capable of implementing the present system and method is shown in FIG. 1. The computer system referred to generally as system 100 may include a central processing unit (CPU) 102, memory 104, a printer interface 106, a display unit 108, a LAN (local area network) data transmission controller 110, a LAN interface 112, a network controller 114, an internal bus 116, a database 120 and one or more input devices 118 such as, for example, a keyboard, mouse, etc. Naturally, other components may be included in the computer system 100 and some components may not be present.

Figure 2:
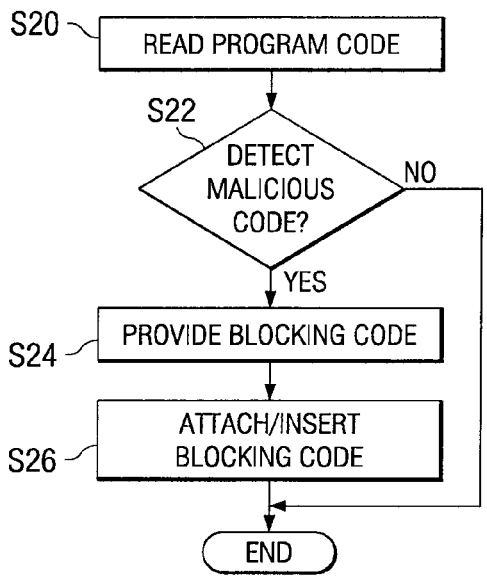
FIG. 2 is a flow chart illustrating a method of preventing execution of malicious code included in program code executable by a computer system according to an embodiment of the present disclosure.

The method of the present disclosure is described in further detail with reference to FIG. 2 The program code is computer executable code which provides instructions to the computer system for performing various tasks to be accomplished by a program or application being executed by the computer system. The program code is typically stored on a storage medium such as an optical disk or a hard disk drive which can be accessed by the computer system The program code, however, may be stored in any type of storage to which the computer system has access. The program code is read out from memory in Step S20 and malicious code, or more specifically, a directory, file or section of malicious code may be detected in the program code at Step S22. Various methods exist for detecting malicious code According to the present disclosure, any known type of malicious code detecting method may be utilized to detect the malicious code. For example, such methods may include signature detection, heuristic detection, etc. Of course, these methods are exemplary of the types of methods that may be used and the present disclosure is not limited thereto. If all of the program code is read and no malicious code is detected ("No", Step S22) the method may end. If malicious code is detected ("Yes", Step S22) the method continues to Step S24.

In step S24, blocking code is provided to prevent execution of the malicious code detected in Step S22, based on the malicious code detected. The blocking code is preferably a code patch or a unit of computer executable code, which has no other function but to prevent execution of the malicious code. Generally, the blocking code provides instructions to the computer system which prevent the malicious code from being executed. The blocking code may also provide a user of the computer system with information explaining why the malicious code is not being executed by displaying a message on a display of the computer system when the blocking code is executed. The blocking code is in a format compatible with a processor, such as CPU 102 of FIG. 1, of the computer system. Generally speaking, the processor of a computer system actually carries out the instructions provided by the program code of a program or application executed by the computer system. More specifically, the processor reads the program code and instructs various elements of the computer system to perform functions instructed by the program code. The blocking code is preferably provided with the same file name as that of the directory or file containing the malicious code The blocking code may prevent execution of the malicious code in several ways, and may depend on the type of malicious code discovered. For example, the blocking code may direct the processor to pass over, or jump over the malicious code without executing the malicious code. Instructing the processor to jump over the malicious code prevents the malicious code from being executed with minimal impact on surrounding program code. Alternatively, the blocking code may instruct the processor to rename a section of the malicious code, or the directory or file in which the malicious code is located. Using this tactic, the malicious code is included in a file or directory which is not accessed by the computer system in the normal operation of the program or application running on the computer system The blocking code may also instruct the processor to delete the malicious code. The blocking code may instruct the processor to copy and transfer the malicious code to another area in the computer system from which the malicious code cannot affect the computer system Generally, the blocking code should provide instructions that prevent or disrupt execution of the instructions provided by the malicious code. Naturally, there are many different ways in which this can be accomplished, of which the above is only a partial list. The present disclosure is intended to cover all such alternative methods.

At Step S26, the blocking code is attached to the malicious code. The blocking code may be positioned before, within or after the section of malicious code, depending on which placement best compliments the method of blocking utilized by the blocking code. For example, positioning the blocking code in front of or at an entry to a file containing the malicious code may be appropriate where the blocking code includes a jump instruction to instruct the processor of the computer system to pass over or jump the malicious code without executing the malicious code. Blocking code which interferes directly with execution of the instructions provided by the malicious code may be positioned within the malicious code itself, for example. Literally inserting the blocking code into or attaching the blocking code to the malicious code not only prevents execution of the malicious code at the time that the malicious code is detected, but also permanently joins the malicious code to the blocking code so that the malicious code is not executed at a future time. The blocking code may be encrypted prior to being attached so that it can not be easily identified and removed at a future time.

Figure 3:
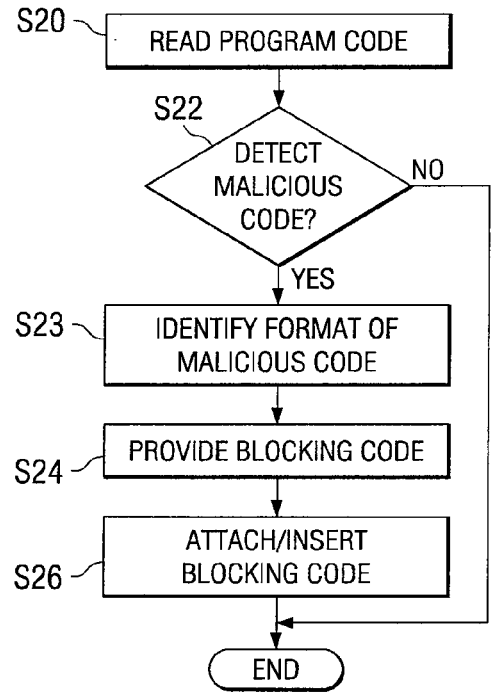
FIG. 3 is a flow chart illustrating a method of preventing execution of malicious code included in program code executable by a computer system according to another embodiment of the present disclosure.

In another embodiment of the present disclosure as shown in FIG. 3, once the malicious code is detected (Step S22), a format or type of the malicious code is identified (Step S23). For example, if the malicious code is detected in a windows application, the malicious code is identified as in a windows format, or as windows type code. The blocking code of the same type or format as the malicious code may be generated or an appropriate blocking code selected, so that the blocking code is launched or executed in the same manner as the malicious code In addition, the harm or type of harm that the malicious code causes the computer system may be identified. Such information may be useful in selecting or generating blocking code that will best instruct the processor to avoid executing the malicious code and thus avoid that harm.

Figure 4:
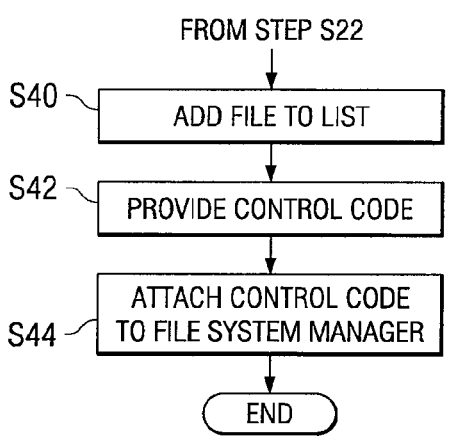
FIG. 4 is a flow chart illustrating a method of preventing execution of malicious code included in program code executable by a computer system according to another embodiment of the present disclosure.

In an alternative embodiment of the present disclosure, the blocking code may be a control code. A method according to this embodiment is illustrated in FIG. 4. The program code is read (Step S20) as described above and malicious code is detected (Step S22) as also described above. A name of the directory or file containing the malicious code is added to and stored in a list of files containing malicious code (Step 40). A control code associated with the list of files including malicious code is then generated (Step 42). The control code is attached to, that is provided to instruct operation of, a file management system of an operating system utilized in the computer system executing the program code (Step 44). The control code instructs the file management system not to access any of the files included in the list of files containing malicious code.

The list of files containing malicious code may be stored in any available storage media accessible to the operating system of the computer system, such as memory 101 of FIG. 1, for example. The control code controls the file management system to prevent the file management system from accessing any of the files included on the list of files containing malicious code Since the control code may be made a permanent part of the instructions under which the file management system operates, the files containing malicious code will not be accessed at a future time. The control code may also be arranged to inform the user of the computer system that the files included in the list are not executable files. Alternatively, the control code may instruct the file management system to rename the files on the list such that the computer system will not access the files.

Figure 5:
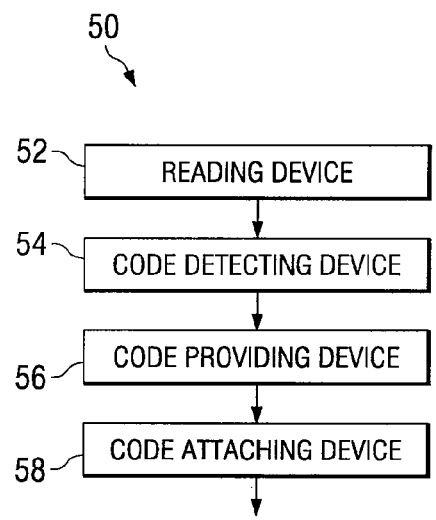
FIG. 5 is a block diagram illustrates a system for preventing execution of malicious code included in program code executable by a computer system according to an embodiment of the present system.

A system 50 for preventing execution of malicious code included in program code executable by a computer system is illustrated in FIG. 5. A reading device 52 is adapted to read the program code from a storage medium of the computer system. A code detecting device 54 is adapted to detect a section of malicious code included in the program code. A code providing device 56 is adapted to provide blocking code to prevent execution of the section of the malicious code by the computer system. A code attaching device 58 adapted to attach the blocking code to the section of malicious code such that execution of the section of malicious code is prevented. A format recognition device (not shown) adapted to identify a format of the malicious code may be included in the code detecting device 54, for example. A renaming device (not shown) may be used to rename a file including the section of malicious code based on instructions provided by the blocking code such that the computer system does not access a resulting renamed file. A code deleting device (not shown) may be used to delete the section of malicious code in accordance with instructions provided by the blocking code A transfer device (not shown) may be used to transfer the section of malicious code to a section of the computer system where the malicious code does not affect the computer system according to instructions provided by the blocking code. The instructions for renaming, deleting and/or transferring the malicious code may be performed by CPU 102, for example. The system 50 of FIG. 5 substantially utilizes the method of preventing execution of malicious code includes in program code executable by a computer system described above and will not be discussed in further detail.

The present disclosure may be conveniently implemented using one or more conventional general purpose digital computers and/or servers programmed according to the teachings of the present specification. Appropriate software coding can readily be prepared based on the teachings of the present disclosure. The present disclosure may also be implemented by the preparation of application specific integrated circuits or by interconnecting an appropriate network of conventional components.

Numerous additional modifications and variations of the present disclosure are possible in view of the above-teachings. It is therefore to be understood that within the scope of the appended claims, the present disclosure may be practiced other than as specifically described herein.

What is claimed is:

1. A method of preventing execution of malicious code included in program code executable by a computer system comprising:
   reading the program code from a storage medium of the computer system;
   detecting a section of malicious code included in the program code read out from the storage medium;
   providing blocking code which prevents the computer system from executing the section of malicious code;
   encrypting the blocking code;
   attaching the blocking code to the section of malicious code such that execution of the malicious code is prevented.

2. The method of claim 1, wherein encrypting the blocking code comprises encrypting the blocking code such that the blocking code cannot be identified and removed from the section of malicious code.

3. The method of claim 1, further comprising:
   identifying a format of the malicious code, wherein the blocking code is provided to be in a format similar to the format of the malicious code.

4. The method of claim 1, wherein the blocking code is a unit of computer executable code which provides instructions to prevent execution of instructions provided by the malicious code by a processor of the computer system which executes the program code.

5. The method of claim 1, wherein the blocking code instructs the computer system to pass over the section of malicious code while executing the program code without executing the malicious code.

6. The method of claim 1, wherein the blocking code instructs the computer system to rename a file including the section of malicious code such that the computer system does not access a resulting renamed file.

7. The method of claim 1, wherein the blocking code instructs the computer system to delete the section of malicious code.

8. The method of claim 1, wherein the blocking code instructs the computer system to copy the section of malicious code to another location in the computer system.

9. The method of claim 1, wherein the blocking code is attached to the malicious code at a position based on how the blocking code prevents execution of the malicious code.

10. The method of claim 1, further comprising:
    determining a type of damage that the malicious code causes to the computer system wherein the blocking code is provided based on the type of damage the malicious code causes to the computer system.

11. A system for preventing execution of malicious code included in program code executable by a computer system comprising:
    a reading device adapted to read the program code from a storage medium of the computer system;
    a code detecting device adapted to detect a section of malicious code included in the program code;
    a code providing device adapted to provide blocking code to prevent execution of the section of the malicious code by the computer system;
    a code encrypting device adapted to encrypt the blocking code;
    a code attaching device adapted to attach the blocking code to the section of malicious code such that execution of the section of malicious code is prevented.

12. The system of claim 11, wherein the code encrypting device is further adapted to encrypt the blocking code such that the blocking code cannot be identified and removed from the section of malicious code.

13. The system of claim 11, further comprising:
    a format recognition device adapted to identify a format of the malicious code, wherein the blocking code provided by the code providing device is provided in a format similar to the format of the malicious code.

14. The system of claim 11, wherein the blocking code is a unit of computer executable code which provides instructions to a processor of the computer system executing the program code to prevent execution of instructions provided by the section of malicious code.

15. The system of claim 11, wherein the blocking code instructs the computer system to pass over the section of malicious code while executing the program code without executing the section of malicious code.

16. The system of claim 11, further comprising:
a renaming device adapted to rename a file including the section of malicious code based on instructions provided by the blocking code such that the computer system does not access a resulting renamed file.

17. The system of claim 11, further comprising:
a code deleting device adapted to delete the section of malicious code in accordance with instructions provided by the blocking code.

18. The system of claim 11, further comprising:
a transfer device adapted to transfer the section of malicious code to a section of the computer system where the malicious code does not affect the computer system according to instructions provided by the blocking code.

19. The system of claim 11, wherein the blocking code is attached to the malicious code at a position based on how the blocking code prevents execution of the malicious code.

20. The system of claim 11, wherein the code detecting device determines a type of harm the malicious code causes the Computer system and the blocking code provided by the code providing device is provided based on the type of harm the malicious code causes to the computer system.

21. A program storage medium, readable by a computer system, embodying a program of instructions executable by the computer system to perform method steps for preventing execution of malicious code included in program code executable by the computer system the method steps comprising:
reading the program code from a storage medium of the computer system;
detecting a section of malicious code included in the program code;
providing blocking code which prevents execution of the section of malicious code;
encrypting the blocking code; and
attaching the blocking code to the section of malicious code such that execution of the section of malicious code is prevented.

22. The program storage medium of claim 21, wherein encrypting the blocking code comprises encrypting the blocking code so that the blocking code cannot be identified and removed from the section of malicious code.

23. The program storage medium of claim 21, wherein the method steps further comprise identifying a format of the malicious code, wherein the blocking code is provided to be in a format similar to the format of the malicious code.

24. The program storage medium of claim 21, wherein the blocking code is computer executable code which provides instructions to a processor of the computer system which executes the program code to prevent execution of instructions provided by the section of malicious code.

25. The program storage medium of claim 21, wherein the blocking code instructs the computer system to pass over the section of malicious code while executing the program code without executing the section of malicious code.

26. The program storage medium of claim 21, wherein the blocking code instructs the computer system to rename a file including the section of malicious code such that the computer system will not access a resulting renamed file.

27. The program storage medium of claim 21, wherein the blocking code instructs the computer system to delete the section of Malicious code.

28. The program storage medium of claim 21, wherein the blocking code instructs the computer system to transfer the section of malicious code to a section of the computer system where the section of Malicious code will not affect the computer system.

29. The program storage medium of claim 21, wherein the blocking code is inserted in the malicious code at a position based on how the blocking code prevents execution of the malicious code.

30. The program storage medium of claim 21, wherein the method steps further comprise:
determining a type of damage that the malicious code causes to the Computer system wherein the blocking code is provided based on the type of damage that the malicious code causes to the computer system.

31. A computer system comprising:
a processor;
a program storage device readable by the computer system, embodying a program of instructions executable by the processor to perform method steps for preventing execution of malicious code included in program code which is executable by the computer system, the method steps comprising:
reading the program code from a storage medium of the computer system;
detecting a section of malicious code included in the program code;
providing blocking code which prevents execution of the section of malicious code;
encrypting the blocking code; and
attaching the blocking code to the section of malicious code such that execution of the section of Malicious code is prevented.

* * * * *